United States Patent [19]
Urso et al.

[11] 3,988,182
[45] Oct. 26, 1976

[54] SIDE SEAM ORIENTATION IN CAN LABELING MACHINE

[75] Inventors: Patrick Francis Urso, Crystal Lake; Earl Roger Van Alsburg, Barrington; Walter Joseph Sieverin, Buffalo Grove, all of Ill.

[73] Assignee: American Can Company, Greenwich, Conn.

[22] Filed: Oct. 31, 1974

[21] Appl. No.: 519,737

Related U.S. Application Data

[63] Continuation of Ser. No. 318,887, Dec. 27, 1972, abandoned.

[52] U.S. Cl. .................... 156/60; 156/567; 198/380; 198/394
[51] Int. Cl.² .................... B65C 3/12; B65G 47/24
[58] Field of Search .......... 198/251, 254, 255, 257, 198/261, 262, 263, 267, 258, 268; 302/2 R; 156/556, 566, 60, 567

[56] References Cited
UNITED STATES PATENTS

| | | | |
|---|---|---|---|
| 2,293,121 | 8/1942 | Dudley | 198/258 |
| 2,793,734 | 5/1957 | Lorenzen | 198/268 |
| 2,843,253 | 7/1958 | Peterson et al. | 198/257 |
| 2,935,176 | 5/1960 | Lorenzen | 198/255 |
| 3,576,247 | 4/1971 | Caulford et al. | 198/257 |
| 3,581,872 | 6/1971 | Grossjowann | 198/41 |

*Primary Examiner*—Evon C. Blunk
*Assistant Examiner*—Jeffrey V. Nase
*Attorney, Agent, or Firm*—Robert J. Auber; Ernestine C. Bartlett; Ira S. Dorman

[57] ABSTRACT

A method and apparatus for orienting cylindrically shaped containers having a side seam in each which is parallel to the longitudinal axis of the container so that operations may be performed on the containers utilizing known and oriented reference points thereon. The method and apparatus for accomplishing this result includes feeding the containers seriatim at a first station to a means for conveying the containers to a second station whereat it is necessary that the containers be oriented in order for an operation to be performed thereon. conveying the containers seriatim from the first station to the second station, and introducing a fluid under pressure and at a volume sufficient to buoy the containers to thereby permit gravity to orient the side seams of the containers in preparation for delivery of the containers seriatim to said second station.

11 Claims, 6 Drawing Figures

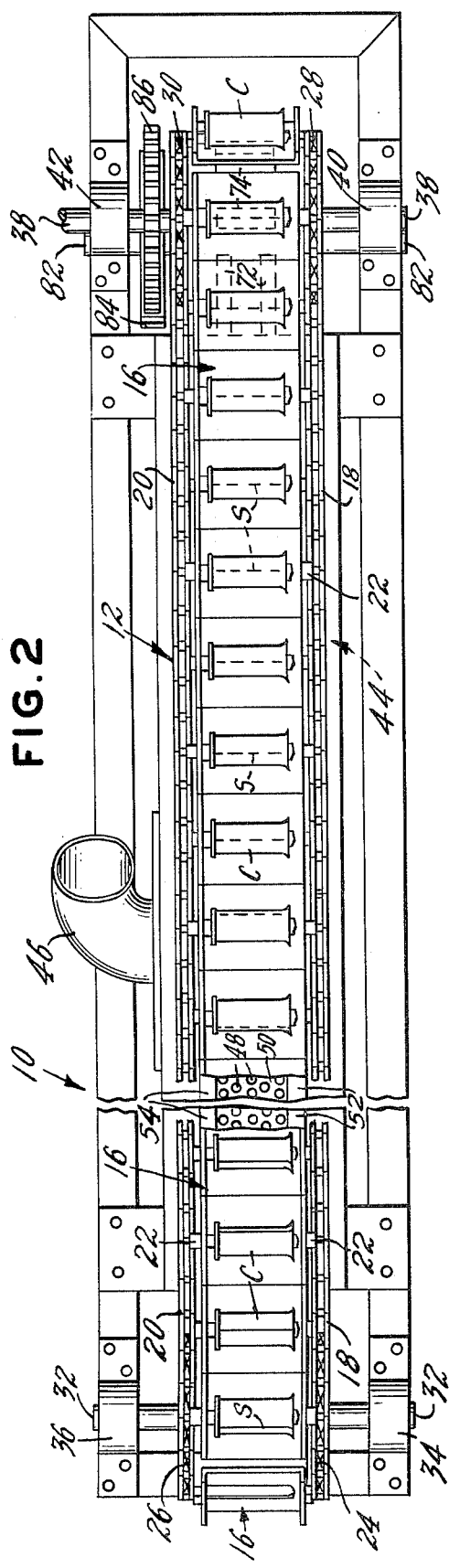
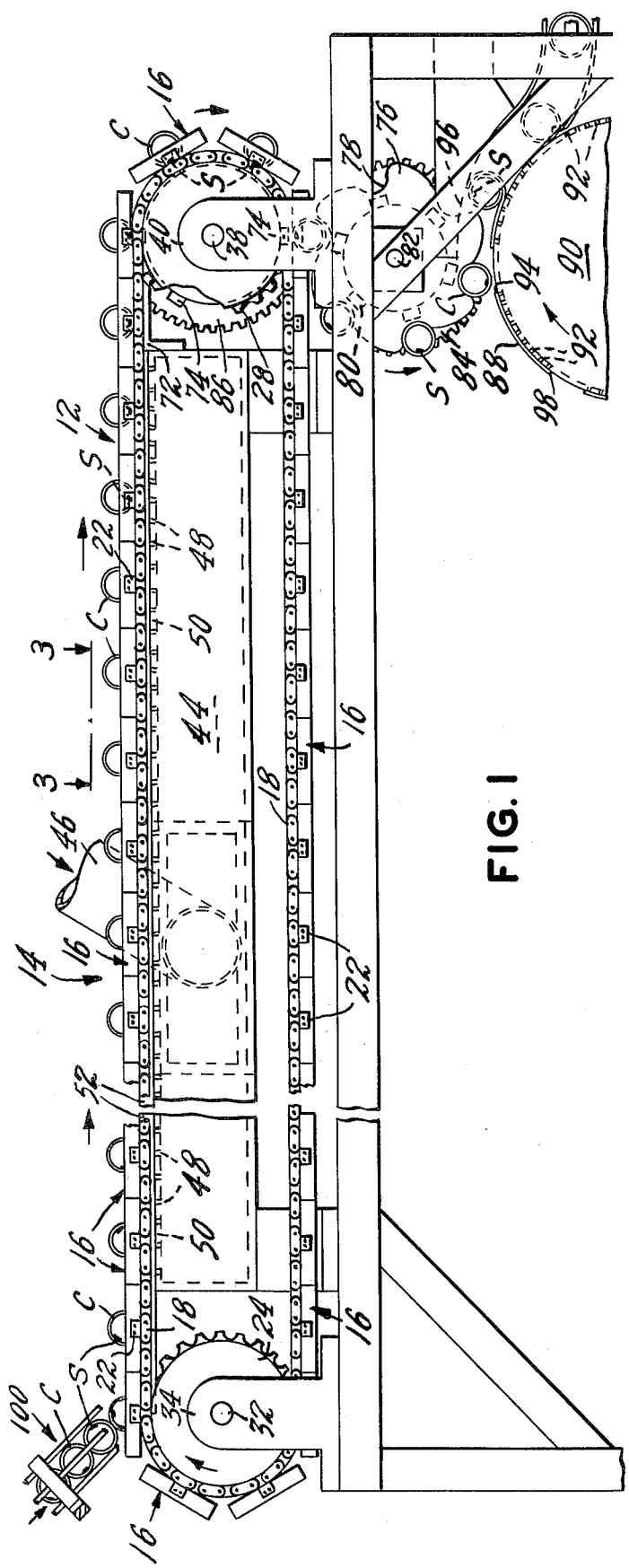

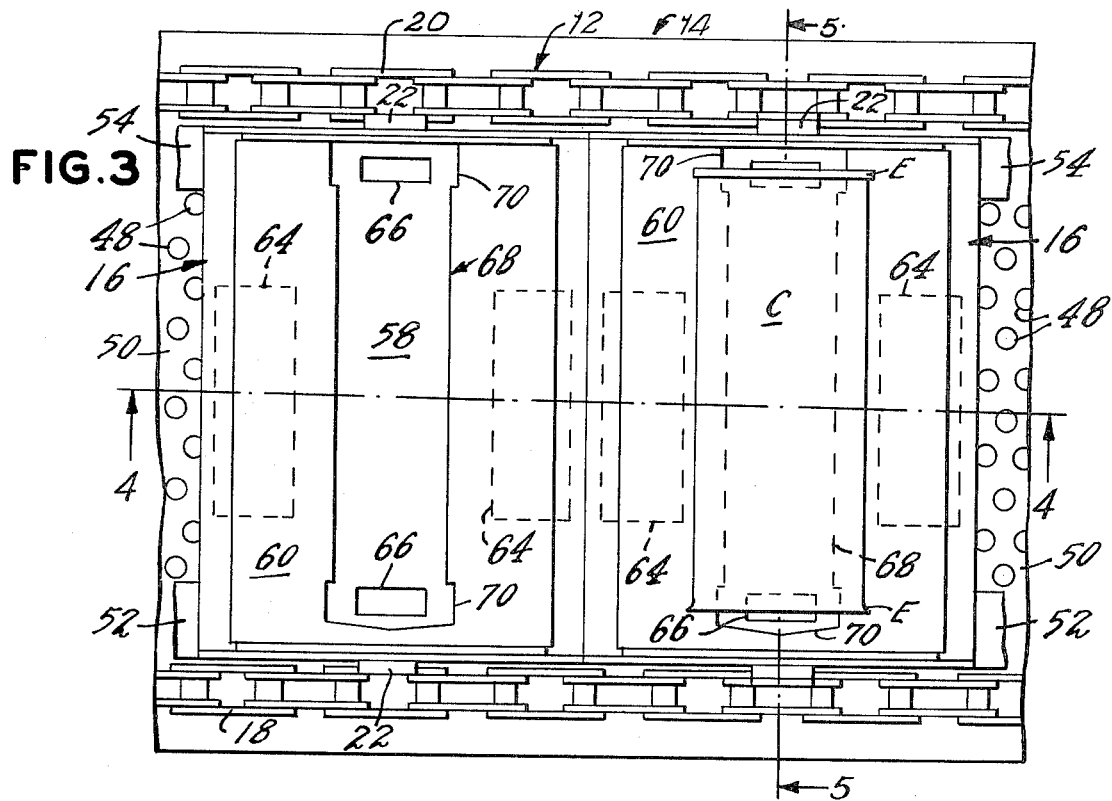
FIG. 3
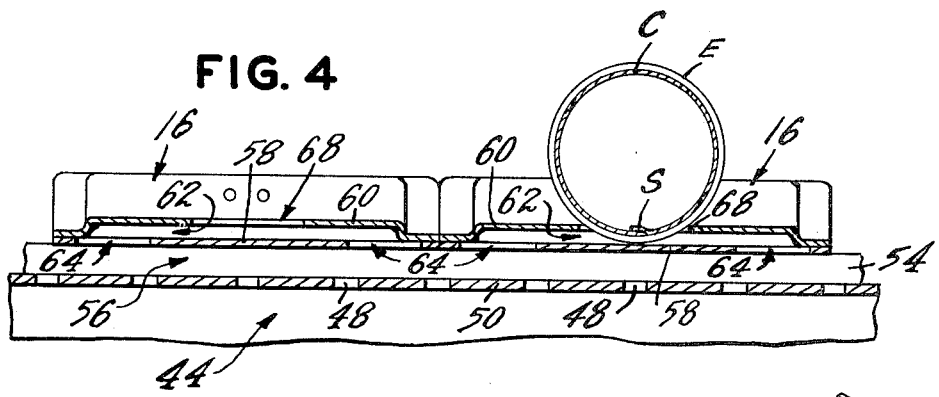
FIG. 4
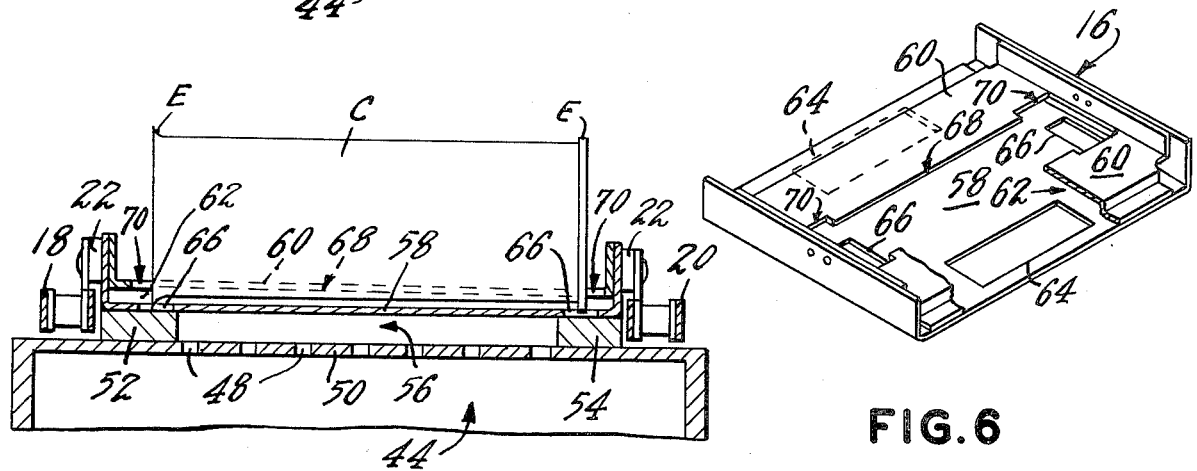
FIG. 5
FIG. 6

SIDE SEAM ORIENTATION IN CAN LABELING MACHINE

This is a continuation of application Ser. No. 318,887 filed Dec. 27, 1972, now abandoned.

The present invention relates generally to a method and apparatus for orienting cylindrically shaped containers having a side seam in each which is parallel to the longitudinal axis of the container. More particularly, the present invention relates to a method and apparatus for orienting such containers so that an operation may subsequently be performed thereon which requires each container to be oriented whereby the side seam on each, being a known reference point, is in a known position.

There are presently two basic types of cylindrically shaped metal containers being manufactured. These are termed, respectively, two-piece and three-piece containers. The two-piece container is generally made by means of a drawing and ironing process wherein one of the two pieces includes the cylindrically shaped container body together with an integral end wall of the container, while the other piece includes an end closure which serves as the remaining end wall of the container. In the three-piece container there are two separate end closures and a cylindrically shaped container body to which the end closures are attached to form the container. The cylindrically shaped body of the three-piece container is made by forming a flat, sheet metal blank into the cylindrical shape and soldering or otherwise bonding the two ends of the blank together to form a side seam of the container. In the usual case this side seam is formed by overlapping the two ends of the blank and then bonding the overlapping portions together. As can be appreciated the side seam itself lends an aesthetically unappealing appearance to the container which cannot be avoided.

In addition, one of the problems encountered in the production of three-piece containers stems from what is termed bow-in at the side seams of the containers which results when the side seams are formed as by soldering. This bow-in is a direct result of the side seam forming process wherein, due to the application of heat and the mechanical operations performed thereat, the ends of the flat sheet metal blank which are joined to form the side seam are flattened and distorted with respect to the cylindrical shape of the container body. This problem, which results from the bow-in of the side seam of the container, relates to the labeling thereof and the aesthetic appearance of the finally labeled container. It has been found that in applying a label to a container having a bowed-in side seam wrinkles develop in the label at the side seam. This wrinkled portion of the label substantially detracts from the attractive appearance and aesthetic qualities of the finished container, particularly in the case where the wrinkles in the label proximate to the bowed-in side seam happen to be located at or near the center portion of the label. One means by which wrinkling of the label at the bowed-in side seam of a three-piece container can be avoided is by applying the label to the body so that the forward edge of the label is adhered to the container body at the area of the side seam, the rearward edge of the label then being brought around to, and adhered to, the container body at the area of the side seam. Preferably the rearward or trailing edge of the label overlaps somewhat the previously applied forward edge, so that the adhesive attachment of the trailing edge actually is made, partly or wholly, to the underlying forward edge of the label rather than to the container body itself. The overlapped portions of the label accordingly may overlie the bowed-in and joined area associated with the side seam of the container. Thus, when the center of the label is positioned for viewing by consumers, the aesthetic detraction of a visible side seam is not a factor, since only the aesthetically desirable portion of the container, i.e. the decoration and information on label, is centrally viewable. Also, any wrinkling of the label in the vicinity of the bowed-in side seam of the container is almost entirely avoided by such application of the label.

However, at the present time the state of the container making art does not teach a simple means by which container bodies having a side seam can be oriented to a particular reference point, i.e. the side seam, so that an operation such as labeling may be performed on the containers utilizing those oriented reference points.

It is, therefore, a primary object of the present invention to provide a method and apparatus by which cylindrically shaped containers having a side seam in each which is parallel to the longitudinal axis of the container can be oriented for the purpose of providing for each container a uniformly positioned refernce point thereby permitting operations to be performed on the containers utilizing the uniformly positioned references.

The above object, as well as others which will hereinafter become apparent, is accomplished according to the present invention by providing a method and apparatus for orienting cylindrically shaped containers having a side seam in each which is parallel to the longitudinal axis of the container whereby said containers are fed seriatim at a first station to a means for conveying the containers to a second station, the containers fed to said conveying means being conveyed thereby seriatim from said first station to said second station, and buoying said containers by the introduction thereunder of a fluid under pressure and at a volume sufficient to buoy the containers to thereby permit gravity to orient the side seams of the containers prior to the conveyance of the containers to said second station whereat an operation is performed on said oriented containers utilizing the orientation thereof to advantage.

The present invention will be described and understood more readily when considered together with the embodiment of the accompanying drawings, in which:

FIG. 1 is a side elevational view of the container orienting apparatus according to the present invention;

FIG. 2 is a plan view of the container orienting apparatus of FIG. 1;

FIG. 3 is an enlarged partial plan view of the container orienting apparatus of the present invention taken along line 3—3 of FIG. 1 wherein one of the containers is removed for sake of clarity;

FIG. 4 is a cross-sectional view of the container orienting apparatus of the present invention taken along line 4—4 of FIG. 3;

FIG. 5 is a cross-sectional view of the container orienting apparatus taken along line 5—5 of FIG. 3; and FIG. 6 is a perspective view of the cradle utilized by the present apparatus showing portions thereof broken away.

Referring now to the drawings, there is shown in FIGS. 1 and 2 an apparatus for orienting containers, generally designated 10, which comprises a conveyor means 12 for conveying containers C from a first station to a second station, and means 14 for buoying the containers C while they are being conveyed by conveyor means 12 between said first and second stations so that the side seams S of the containers are oriented.

The conveyor means 12 is comprised of an endless series of cradles, generally designated 16, which are carried by endless chains 18 and 20 which in turn are connected to the individual cradles 16 by means of connecting links 22. Chains 18 and 20 are driven by chain wheels 24-26 and 28-30. Chain wheel 24-26 is carried by shaft 32 which is mounted to rotate in bearings 34 and 36. Chain wheel 28-30 is carried by shaft 38 which is mounted for rotation in bearings 40 and 42 and is driven in a clockwise direction by means of suitable motor (not shown).

The means 14 for buoying the containers C during their conveyance between station 1 and station 2 so that the containers can thereby be oriented, comprises a plenum chamber, generally designated 44, disposed beneath the upper series of cradles being conveyed between the two stations, an intake 46 opening into the plenum chamber for introducing a pressurized fluid thereto, and a series of openings, generally designated 48, in the upper surface 50 of chamber 44. The openings 48, being directly beneath cradles 16 conveying the containers C between the first and second stations directs the pressurized fluid entering chamber 44 through intake 46 upwardly to the underside of cradles 16. As clearly seen in FIGS. 4 and 5, cradles 16 are additionally supported by support rails 52 and 52 which are longitudinally positioned on the upper surface 50 of chamber 44 such that a shallow chamber 56 is formed between the substantially uninterrupted surface of bottom plates 58 of cradles 16 and the upper surface 50 of plenum chamber 44 and further bounded by support rails 52 and 54.

As clearly seen in FIG. 6, each individual cradle 16 is basically comprised of a bottom plate 58 and a top plate 60 separated therefrom to form a space or chamber 62 (FIG. 4). Bottom plate 58 is provided with openings 64, disposed on opposing sides of the longitudinal axis of cradled container C, through which the pressurized fluid from chamber 56 passes into chamber 62 of cradles 16. Opening 68 in upper plate 60 is shaped to permit container C to be cradled in the opening, as clearly seen in FIGS. 3 through 5. Opening 68 is provided with enlarged portions 70 in order to accomodate the end seams or seaming flanges E of the container C. The disposition of openings 64 on opposing sides of the longitudinal axis of container C cradled in opening 68 causes an "air knife" effect by the pressurized fluid on that portion of container C lying below top plate 60.

Openings 66 in bottom plate 58 are because of the shallowness of chamber 62, for the purpose of accomodating the chimes or end seams or seaming flanges E of a container so that the container maintains a low profile in cradle 16. As can be seen in FIG. 5, openings 66 are covered by support rails 52 and 54 while cradles 16 pass over plenum chamber 44. Thus, as can be easily seen in FIGS. 4 through 6, pressurized fluid enters chamber 56 via openings 48 in the upper surface 50 of plenum chamber 44 and then, via openings 64, the pressurized fluid enters chamber 62 of cradles 16 and impinges upon the undersides of the containers C.

After the container carrying cradles 16 have passed over plenum chamber 44 which, by means of the pressurized fluid impinging on the undersides of the containers, buoys the containers thereby orienting the side seams' S of the containers, which, having a double thickness of material and therefore greater weight, are oriented to the lower most position, as clearly seen in FIGS. 1 and 2, means, generally designated 72, is provided to maintain the orientation of the oriented containers C until the cradles 16 are passed about chain wheel 28-30. As the cradles 16 carrying the containers C pass about chain wheel 28-30, additional means 74 are provided to hold the containers C within the cradles 16 and also to maintain the orientation of the containers. Both means 72 and 74 may be magnetic so long as containers C are formed having bodies formed of a magnetically attractable material. Alongside cradles 16, as they pass around chain wheel 28-30, is positioned a transfer turret, generally designated 76, which rotates in a direction counter to the rotation of chain wheel 28-30 and is provided with circumferential pockets, designated 78, for engaging the containers C as the cradles 16 pass about chain wheel 28-30. Means, generally designated 80, are provided on the transfer turret for removing the containers C from the cradles 16. Means 80 may be magnetic and must have sufficient strength to overcome the magnetic means 74 on chain wheel 28-30. Transfer turret 76 is rotated by shaft 82 which is driven by gears 84 and 86 mounted on shafts 82 and 38 respectively. The containers C are fed by the transfer turret 76 to an operation station at which it is necessary that the side seams of the containers C be in a known and knowable position so that an operation may be performed on the containers utilizing the container side seam positioning. One such operation which may be performed on the containers is a labeling operation, which is described hereinbelow as illustrative of further operations which may be carried out when the containers have been positioned with respect to the orientation of their side seams. Thus, a label generally designated 88, and held onto the labeling drum 90 by means of a vacuum drawn through openings 92 in the surface of drum 90, is applied to container C. Drum 90 and transfer turret 76 are so synchronized as to counter-revolve so that the leading edge 94 of labels 80 meet with the circumferential portion of containers C at seam S. Thereafter, containers C are guided by means of guide rails 96 which permit the containers C to be rotated by the rotation of drum 90 so that the containers may be labeled properly with the leading edge 94 of the labels adhered to the containers at the areas of the side seam S thereof and the trailing edge 98 of the labels also meeting and adhering to the circumference of the containers at the areas of the side seams S thereof.

The first station from which the conveyor means 12 conveys the containers C comprises a container feeding means, generally designated 100, which serially feeds containers C to cradles 16. It is to be noted, as described above, that other different operations may be performed at the second station which require the containers to be oriented as described above, examples are printing, etc.

In operation, the containers C, as seen in FIGS. 1 and 2, are fed serially by feeding means 100 to conveyor 12 where a single container C is deposited in each of the cradles 16 for conveyance across the buoying means 14 and to the second station. The container C, as seen in FIGS. 3 to 5, is cradled in opening 68 in the upper plate 60 of cradle 16 while the end seams E or chimes of the containers are cradled in the enlarged portions 70 of opening 68 and openings 66 in the upper and lower plates 60 and 58 respectively of cradle 16. As the containers C are conveyed by the conveyor means 12, in the direction of the arrow indicated in FIG. 1, the cradles pass over plenum chamber 44 where the pressurized fluid such as air impinges upon the undersides of cradles 16. The pressurized air, which is supplied by a source (not shown) at a sufficient pressure and volume—that is, quantity or rate of flow—to buoy the containers C, is introduced to plenum chamber 44 through intake 46 and passes through openings 48 in upper surface 50 of chamber 44. From plenum chamber 44 the pressurized air enters chamber 56 which is established between upper surface 50 of chamber 44, the continuous surface established by the interconnecting plates 58 of cradles 16, and support rails 52 and 54. The pressurized fluid then passes through the oppositely disposed openings 64 in lower plate 58 of cradle 16 and into chamber 62 to establish an "air knife" effect on container C by being directed tangentially toward the lower portion of the side wall of container C lying below top plate 60 from the side, by causing the fluid to travel horizontally along the passageway established by shallow chamber 62 rather than impinging directly upwardly on the container, as indicated by the arrows in FIG. 4. It has been found that by directing a stream of pressurized fluid vertically upwardly upon the lower portion of the side wall of a cradled container caused the container to be forced downwardly rather than upwardly, thus necessitating the air to be directed tangentially toward the lower most portion of the container. As clearly seen in FIG. 4, the fluid escaping through opening 68 lifts the container C from its cradled position and supports it under a cushion of pressurized fluid. While containers C are buoyed by the fluid pressure or cushion, the heavier portions of the containers, which are at the side seams S in side seamed containers, are oriented so that the side seams seek the lower most position by force of gravity.

As the containers C travel along the conveyor means 12 to the end of plenum chamber 44 and are oriented in the process, magnetic means 72 maintain the containers C in the oriented position between plenum chamber 44 and chain wheel 28-30. Thus, the containers C, once they have been oriented by means of the buoying effect produced by the pressurized fluid passing through plenum chamber 44, are maintained in that oriented position by the magnetic means 72 until cradles 16 reach chain wheel 28-30 where magnetic means 74, attached circumferentially to the chain wheel, maintain the containers C in the oriented position as the cradles 16 pass around the chain wheel. At some point in the travel around chain wheel 28-30 the containers C are removed from cradles 16 by a transfer turret 76 which is provided with magnets 80 which in conjunction with pockets 78 remove the containers C from cradles 16 and transfer the containers to the second operation position.

As can be seen in FIG. 1, the transfer turret 76 picks up the containers C from the cradles 16 in such a manner that the side seams S thereof have a known relative position and so when the containers are delivered to the second station, in this case a labeling machine, the operation performed on the containers can utilize the orientation to advantage. The labeler in this case carries labels 88 on drum 90 by means of suction applied through opening 92 in drum 90. As the label 88 approaches a container C, carried by transfer turret 76, the leading edge 94 of the label contacts the container C at the side seam S thereof, the container is then transferred to guide 96 where it is rotated as the label 88 is applied thereto.

It is to be understood that the foregoing general and detailed descriptions are explanatory of the present invention and are not to be interpreted as restrictive of the scope of the following claims.

What is claimed is:

1. Apparatus for orienting cylindrically shaped containers having a side seam in each which is parallel to the longitudinal axis of the container so that an operation can be performed on the containers utilizing the oriented side seams, which comprises:
   a. means for conveying said containers from a first station to a second station comprising cradles serially positioned for serially carrying said containers;
   b. means for feeding said containers serially to said cradles at said first station:
   c. a chamber of pressurized fluid positioned beneath the cradles on said conveying means intermediate said first and second stations;
   d. means in said cradles and chamber communicating the containers with the pressurized fluid in said chamber, said means comprising an upper plate and a lower plate defining a horizontal chamber therebetween, said upper plate having a longitudinal opening therein for cradling a container, and said lower plate having a pair of openings therein each disposed on opposing sides of the longitudinal opening in said upper plate and communicating with the pressurized fluid in said chamber, said means directing the pressurized fluid upwardly and on opposing sides of the longitudinal axis of the containers to contact the undersides of the containers to buoy said containers and permit gravity to orient the side seams thereof;
   e. means for transferring said oriented containers from said conveying means to said second station and
   f. means for maintaining the orientation of the oriented side seam subsequent to the orientation by gravity on said conveying means and during transfer from said conveying means to said second station.

2. The apparatus for orienting cylindrically shaped containers as defined in claim 1 wherein said containers are formed of a mateial which is magnetically attractable.

3. The apparatus for orienting cylindrically shaped containers as defined in claim 2 wherein said means for maintaining the orientation of the oriented side seam includes means for producing a magnetic field positioned subsequently to the orientation of the containers by gravity.

4. The apparatus for orienting cylindrically shaped containers as defined in claim 1 wherein said pressurized fluid comprises air under pressure.

5. The apparatus for orienting cylindrically shaped containers as defined in claim 1 wherein said second station comprises labeling means for applying labels to the containers.

6. Apparatus for orienting cylindrically shaped containers having a side seam in each which is parallel to the longitudinal axis of the container so that an operation can be performed on the containers utilizing the oriented side seams which comprises:

a. means for conveying said containers from a first station to a second station comprising cradles serially positioned for serially carrying said containers;

b. means for feeding said containers serially to said cradles at said first station;

c. a chamber of pressurized fluid positioned beneath the cradles on said conveying means intermediate said first and second stations; and d. means in said cradles and chamber communicating the containers thereon with the pressurized fluid in the chamber, said means comprising an upper plate and a lower plate defining a horizontal chamber therebetween, said upper plate having longitudinal opening therein for horizontally cradling a cylindrically shaped container so that a longitudinal portion of the sidewall of said container extends therein, and said lower plate having a pair of openings therein each disposed on opposing sides of the longitudinal opening in said upper plate and communicating with the pressurized fluid in said chamber so that the pressurized fluid entering said openings is directed substantially horizontally in said chamber to tangentially impinge upon the undersides of the containers from opposing directions thereby creating an air knife effect to orient the side seams thereof.

7. The apparatus for orienting cylindrically shaped containers as defined in claim 6 including means for transferring said oriented containers to said second station and means for maintaining the orientation of the oriented side seam during transfer.

8. A method of orienting cylindrically shaped magnetically attractable containers having a side seam in each which is horizontally positioned and parallel to the longitudinal axis of the container so that an operation can be performed on the container utilizing the side seams, comprising:

a. serially feeding said containers at a first station to cradles serially positioned on a means for conveying the containers to a second station, said cradles comprising upper and lower plates, said upper plate having a longitudinal opening therein for horizontally cradling the cylindrically shaped container so that a longitudinal portion of the sidewall extends therein and said lower plate having a pair of openings therein each disposed on opposite sides of the longitudinal opening in the upper plate;

b. serially conveying said containers carried by said cradles from said first station to said second station;

c. providing a chamber of pressurized fluid beneath said cradles on said conveying means intermediate said first and second stations;

d. direction a sufficient volume of pressurized fluid from said chamber through the openings in said cradles upwardly and on opposing sides of the longitudinal axis of the containers to contact the undersides of the containers carried by said cradles as said cradles pass over the chamber of pressurized fluid to thereby buoy said containers and permit gravity to orient the side seams thereof; and e. maintaining the orientation of the oriented side seam of said containers on said conveying means by magnetically attracting the containers subsequently to the orientation of the side seam.

9. The method of claim 8 including the step of transferring said oriented containers to said second station and maintaining the orientation magnetically during said 10. The method of claim 8 wherein said second station includes the step of labeling the containers as they are delivered thereto.

11. The method of claim 10 wherein said labeling step includes adhering the forward edge of the labels to the oriented side seams of the containers.

* * * * *